United States Patent Office 3,358,011
Patented Dec. 12, 1967

3,358,011
PYRETHRIC AND CHRYSANTHEMIC ACID ESTERS OF 4-(ALKENYL, CYCLOALKENYL OR ALKADIENYL) BENZYL ALCOHOL AND ALKYL SUBSTITUTED 4-(ALKENYL, CYCLOALKENYL OR ALKADIENYL) BENZYL ALCOHOL
Michael Elliott, Harpenden, England, assignor to National Research Development Corporation, London, England, a corporation of Great Britain
No Drawing. Filed Mar. 9, 1964, Ser. No. 350,576
Claims priority, application Great Britain, Mar. 18, 1963, 10,701/63, 10,702/63; Oct. 29, 1963, 42,715/63
6 Claims. (Cl. 260—468)

This invention relates to new insecticidal derivatives of chrysanthemic and related acids, and to processes for their preparation.

The naturally occurring insecticide pyrethrum, obtained from the flower heads of Chrysanthemum cinerariaefolium and related species, is now a well established insecticide having a range of desirable biological properties, including a high insecticidal toxicity and rapid knock-down effect, coupled with low mammalian toxicity, and in its combination of favorable properties is superior to many synthetic insecticides which have become available. Unfortunately, however, natural pyrethrum is rather unstable in many formulations in common use and furthermore does not form a sufficiently persistent insecticidal film on all the materials and surfaces to which it needs to be applied in practice. It is also expensive and economic factors could make it in short supply.

Much work has been done, therefore, in an attempt to prepare synthetic insecticides having a combination of desirable biological and physical properties such as high toxicity to insects and very low mammalian toxicity, and this investigation has been facilitated by the determination of the structure of four related esters in natural pyrethrum. A number of esters of the so-called chrysanthemic and pyrethric acids and their derivatives have been prepared, notably allethrin, but even allethrin is inferior in many respects to the natural pyrethrum and it is also difficult and expensive to prepare. At present the use of the pyrethrins and their synthetic relatives is largely restricted to household and industrial application because of their instability and high price.

It is therefore still desirable to have synthetic pyrethroids available having, in addition to high insecticidal activity, rapid knock-down effect and lack of mammalian toxicity, a higher stability and good weather resistance.

The present invention comprises new compounds of the general formula

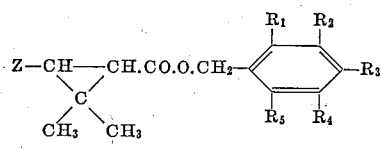

I in which Z represents an aryl, alkenyl or carboalkoxyalkenyl group, $R_3$ represents a halogen atom or an alkyl, alkenyl or alkadienyl group and $R_1$, $R_2$, $R_4$ and $R_5$, which may be the same or different, each represent hydrogen or halogen atoms or alkyl, alkenyl or alkadienyl groups, not more than two of $R_1$, $R_2$, $R_4$ and $R_5$ representing hydrogen atoms when $R_3$ represents a halogen atom or alkyl group.

It will be seen that the compounds of the invention may be regarded as derivatives of cyclopropane carboxylic acids of the general formula

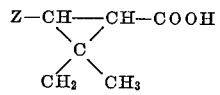

II and derivatives of these acids where Z represents an isobutenyl group or a 2-carbomethoxy-prop-1-enyl group, i.e. derivatives of chrysanthemic acid or pyrethric acid respectively, have been found to be particularly active. Acids of the Formula II can exhibit optical and geometrical isomerism, the various isomers producing compounds of varying insecticidal activity, and it is preferred to use the isomer producing the compound of greatest activity. Thus in the case of chrysanthemic and pyrethric acids it is found that the (+)-trans acids, obtained from natural pyrethrum produce more active compounds than their synthetic counterparts, the (±)-cis-trans isomers, which nevertheless still produce valuable insecticides.

Other useful insecticides of the Formula I may be obtained from 2,2-dimethyl-cyclopropane carboxylic acid substituted in the 3 position by other alkenyl group or by aryl groups for example a phenyl group.

The substituted benzyl group in the compounds of the invention is either an alkenyl or alkadienyl substituted benzyl group which may be further substituted by halogen atoms or alkyl, alkenyl or alkadienyl groups or is a halogen or alkyl substituted benzyl group which is further substituted by at least two halogen atoms or alkyl, alkenyl or alkadienyl groups.

The unsaturated substituent when present is preferably in the para position in the ring, and such an unsaturated substituent is preferably one in which there is no double bond in conjugation with the ring, for example $R_3$ may be an allyl, methallyl, but-2-enyl, but-3-enyl, penta-2,4-dienyl, hexa-2,4-dienyl or cyclopent-2-enyl group. This unsaturated substituent may be the only substituent present in the ring in which case $R_1$, $R_2$, $R_4$ and $R_5$ represent hydrogen atoms or there may be further substituents present. It has been found that the insecticidal activity of the compounds having an unsaturated substituent in the para position is often enhanced with respect to certain insects if one or both of the ortho positions are substituted by lower alkyl groups containing up to 4 carbon atoms and particularly when both ortho positions are substituted by methyl groups.

The alkyl substituted benzyl esters of the invention are preferably those in which the alkyl group is one containing up to 4 carbon atoms, particularly a methyl group and valuable insecticidal esters are obtained when both ortho positions are substituted by lower alkyl groups such as methyl groups and the para position is substituted by an unsaturated substituent or a further lower alkyl group. Compounds with this symmetrical 2,4,6-trisubstitution are often found to be the more active compounds but the related tetra- and penta-substituted compounds such as the 2,3,5,6-tetramethyl-4-allyl-benzyl, pentamethyl benzyl and 2,3,5,6-tetramethyl benzyl esters often have more desirable physical properties and hence also make useful insecticides.

The halogen substituted benzyl esters of the invention preferably contain at least three fluorine or chlorine atoms and in this series the pentafluorobenzyl ester is of interest.

The compounds of the invention may be prepared by any of the methods customarily used for the preparation of esters and the reactants may be represented generically by the formulae

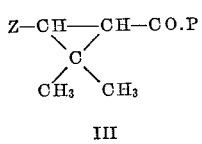 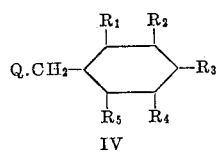

III    IV where CO.P and Q represent functional groups which react together to give an ester linkage.

Thus esters may be prepared by reacting a substituted benzyl alcohol with the cyclo-propane carboxylic acid or more preferably, with its acid halide, for example by treating the reactants in a solvent in the presence of a hydrogen halide acceptor such as pyridine.

A useful alternative method involves the treatment of a substituted benzyl halide with a silver salt of the cyclopropane carboxylic acid; in this method a rather purer product is obtained and the silver is of course recoverable for further use. This method may be modified to avoid the need for a silver salt by reacting the benzyl halide with a triethylamine salt of the cyclopropane acid. This salt may be prepared in situ by reacting equimolar quantities of the acid and triethylamine. The method involving the reaction of a carboxylate salt with a benzyl halide is often preferred when a polyalkyl benzyl ester is desired as the polyalkyl benzyl halides are readily obtainable by halomethylation of the corresponding polyalkyl benzene.

The tri, tetra and penta substituted benzyl alcohols and certain of the mono and di substituted benzyl alcohols of the general Formula IV such as 4-allyl-benzyl alcohol are new compounds.

The alkenyl substituted benzyl alcohols used as intermediates in the preparation of the compounds of the invention may be generally prepared from a dihalogeno benzene by Grignard reactions. In these reactions the alkenyl group is introduced as a first step by reacting a halogeno phenyl magnesium halide with an alkenyl halide and the resulting product, after conversion into the magnesium derivative, reacted with formaldehyde to introduce the hydroxymethyl group. In the case of propenyl benzyl alcohol a modification of this method may be used in which, as the first step, the Grignard compound is reacted with propionaldehyde to give a tertiary carbinol which is dehydrated to introduce the double bond.

An alternative and often preferred method for the preparation of these alkenyl benzyl alcohols involves the introduction of the alkenyl group as a final stage. In this method a halogeno benzyl alcohol is first converted to its tetrahydropyranyl ether which is then treated with magnesium and the resulting Grignard compound reacted with the alkenyl halide. The protecting ether group is finally removed, for example by refluxing with a little p-toluene sulphonic acid in aqueous alcohol. 4-alkenyl-2,6-dialkyl benzyl alcohols in which the alkenyl group is an allyl or substituted allyl group may be prepared by a modification of this process which avoids the use of a 4-halo-2,6-dialkyl benzyl alcohol. In this alternative synthesis an N-alkenyl-2,6-dialkylaniline is heated in the presence of a Lewis acid such as zinc chloride to give the 4-alkenyl-2,6-dialkylaniline which is diazotised and treated with cuprous bromide. The resulting 4-alkenyl-2,6-dialkyl bromobenzene is then converted to a Grignard reagent and reacted with formaldehyde to give the desired 4-alkenyl-2,6-dialkyl benzyl alcohol.

The polyalkyl substituted benzyl alcohols may be prepared by the general methods of halomethylating a substituted benzene to give the substituted benzyl halide which may then be treated with sodium acetate and the ester so formed finally hydrolysed to give the alcohol.

The compounds of the invention may be formulated with an inert carrier or diluent to give insecticidal compositions and they may be prepared for example, in the form of dusts and granular solids, mosquito coils, wettable powders, emulsions, sprays and aerosols after addition of appropriate solvents, diluents and surfactants.

Certain tri, tetra and penta substituted benzyl esters of the invention are solid at room temperature in contrast to the majority of known pyrethroid compounds and hence are particularly desirable from the handling, transport and storage points of view. A particularly advantageous method of application of such solid compounds, where a high weather resistance is desired, is to incorporate the active compound into a lacquer base thus providing an insecticidal lacquer which may be sprayed onto the site and from which the active compound is not easily leached.

The compounds of the invention also show high insecticidal activity against various Diptera, e.g. mosquitoes and stored product pests such as adult *Tenebrio molitor* and furthermore are of use in the field of plant protection and in the field of medical entomology, for example in malarial control where the incidence of resistance to chlorinated hydrocarbon and organophosphorus insecticides is increasing.

The compounds, and especially the solid compounds, may be deposited on paper bags and sacks to give long lasting protection against insect attack to the contents of the paper bags and sacks. By reason of their lack of mammalian toxicity the compounds of the invention may be added to water supplies to kill larval and adult stages of insects e.g. mosquitoes. The compounds may also be used to kill ticks and mites on cattle and sheep; be added to chicken feed to suppress roundworm and be added to cattle food to control face-fly larval.

In common with pyrethrum and synthetic pyrethroids the compounds of the invention may be synergised for example, with piperonyl butoxide or with other well known pyrethrum synergists.

The following examples in which temperatures are in ° C. are given to illustrate the invention.

EXAMPLE 1

*4-allyl-benzyl(±)-cis-trans-chrysanthemate*

(a) *4-allyl-benzyl alcohol.*—Magnesium (108 g.) is baked at ca. 100° for 30 minutes then allowed to cool. p-Dibromobenzene is dissolved in the minimum of ether (about 4 l.) and ca. 50 ml. of this solution is run onto the magnesium. A little methyl iodide is added and as soon as the reaction is well started, stirring is begun and more solution is added so that ether reflux is controlled. 30 minutes after all the solution is added, allyl bromide (620 g.) in anhydrous ether (1 l.) is added with stirring and the reaction is set aside overnight. Next day the mixture is decomposed by the cautious addition of water with stirring until no more heat is evolved. The mixture is then subjected to steam distillation. After ether distillation is finished, about 8 litres of distillate is collected and the organic layer is isolated and combined with an ethereal extract (500 ml. of ether) of aqueous layer. The ether is removed by distillation and the resins distilled up a fractionating column at ca. 15 mm. The main fraction, 4-allyl-bromobenzene, boils at 105°/15 mm. and has $n_D^{20}$ 1.5507. Yield, about 80%.

To magnesium turnings, dried as before, a small portion (50 ml.) of allylbromobenzene (591 g.) in tetrahydrofuran (1.8 l.) is added. The reaction is initiated with methyl iodide, and when started, the rest of the solution is added with stirring. 30 minutes after the reaction is complete, the rate of stirring is increased and fromaldehyde vapor is passed in until vigorous refluxing ceases. The reaction mixture is decomposed by the dropwise addition with stirring of saturated ammonium chloride solution (600 ml.). The liquid layer resulting is combined with an ether washing (200 ml.) of the solid and evaporated at reduced pressure. The residue is dissolved in ether (2 l.) and washed with saturated potassium hydrogen carbonate solution (1 l.), with saturated sodium chloride solution (2×1 l.) dried (Na$_2$SO$_4$) evaporated by distillation and the residue distilled at 0.01 mm. up a Vigeux column. The main fraction of 4-allylbenzyl alcohol, boiling at about 80° has $n_D^{20}$ 1.5325. Yield about 70%.

(b) *4-allyl-benzyl alcohol (alternative method)*.—4-bromobenzyl alcohol (1 mol) is added dropwise over 30 minutes to 3 mols dihydropyran to which one to three drops of concentrated hydrochloric acid have been added. The mixture is set aside for sixteen to twenty-four hours, diluted with ether, washed and dried and 86% 4-bromo- 140–2°/3 mm., $n_D^{20}$ 1.5417 after evaporation of the ether.

Magnesium (1.1 mols) is covered with purified tetrahydrofuran and treated with a small amount of the 4-bromobenzyl alcohol tetrahydropyranyl ether and then with a crystal of iodine and/or 2 drops methyl iodide. The mixture is warmed to start the reaction and then the rest of the tetrahydropyranyl ether, making a total of 1 mol, added quickly in tetrahydrofuran. When the addition is complete the mixture is refluxed a further fifteen minutes and 1.3 mols allylbromide added rapidly. The mixture is allowed to stand overnight and then refluxed thirty minutes, cooled and saturated ammonium chloride solution cautiously added to decompose the complex until the solution is clear. The organic layer is decanted off, washed and the solvent removed. The residue is then refluxed one hour with 0.1–0.3 g. p-toluene sulphonic acid in 50% aqueous ethanol, about 5 mls. per ml. of allylbromide used, most of the ethanol removed and the mixture poured into water. The water is extracted with ether and the ether layers washed, dried and distilled to give 42% 4-allylbenzyl alcohol.

(c) (±)-cis-trans-chrysanthemoyl chloride (1 mol, B.P. 98–100°/12 mm., prepared by treating the acid with thionyl chloride in anhydrous ether at room temperature for sixteen to twenty-four hours) is added dropwise to a mixture of 1 mol 4-allylbenzyl alcohol and 1 mol pyridine in benzene at 0° C. The mixture is allowed to warm at room temperature over sixteen to twenty-four hours and is then poured on the ice and diluted with ether. The solution is washed with dilute sulphuric acid, saturated potassium hydrogen carbonate and then dried and distilled to give 4-allyl benzyl (±)-cis-trans-chrystanthemate, B.P. 135°/6×10$^{-3}$ mm., $n_D^{20}$ 1.5182.

EXAMPLE 2

*4-allyl-benzyl (+)-trans-chrystanthemate*

(+)-Trans-chrysanthemoyl chloride, B.P. 92°–3°/10 mm., prepared by treating the acid with thionyl chloride at room temperature, is reacted with 4-allyl-benzyl alcohol as described in Example 1(c) to give 4-allylbenzyl (+)-trans-chrystanthemate, B.P. 141–9°/4×10$^{-2}$ mm., $n_D^{20}$ 1.5206.

EXAMPLE 3

*4-allyl-benzyl (+)-trans-pyrethrate*

(+)-Trans-pyrethroyl chloride, B.P. 102°–3°/0.2 mm., prepared from pyrethrins concentrated with nitromethane (Barthel, Haller and La Forge, Soap, N.Y., 1944, 20 (7), 121) by the method of La Forge et al. (J. Org. Chem. 1952, 17, 381) is reacted with 4-allylbenzyl alcohol as described in Example 1(c) to give 4-allyl benzyl (+)-trans-pyrethrate, B.P. 163–175°/0.4 mm., $n_D^{20}$ 1.5340.

EXAMPLE 4

*4-allyl-benzyl (±)-3-phenyl-2,2-dimethyl cyclopropane carboxylate*

(±)-3-phenyl-2,2-dimethyl cyclopropane carboxylic acid chloride, B.P. 96°/0.6 mm., prepared by treating the acid with thionyl chloride at room temperature, is reacted with 4-allylbenzyl alcohol as described in Example 1(c) to give 4-allyl-benzyl (±)-3-phenyl-2,2-dimethyl cyclopropane carboxylate, B.P. 158–65°/3×10$^{-4}$ mm. $n_D^{20}$ 1.5501.

EXAMPLE 5

*4-vinyl-benzyl (±)-cis-trans chrysanthemate*

4-vinyl-benzyl alcohol, M.P. 24° prepared by a modification of the method of Abramo and Chapin, J. Org. Chem., 1961, 26, 2671, is reacted with (±)-cis-trans-chrysanthemoyl chloride as described in Example 1(c) to give 4-vinyl-benzyl (±)-cis-trans-chrystanthemate, B.P. 152°/0.1 mm., $n_D^{20}$ 1.5368.

EXAMPLE 6

*4-vinyl-benzyl (+)-trans-pyrethrate*

4-vinyl-benzyl alcohol is reacted with (+)-trans-pyrethroyl chloride as described in Example 1(c) to give 4-vinyl - benzyl (+)-trans - pyrethrate, B.P. 160–4°/ 5+10$^{-2}$mm., $n_D^{20}$ 1.5458.

EXAMPLE 7

*4-crotyl-benzyl (±)-cis-trans-chrysanthemate*

(a) 4-bromo-benzyl alcohol tetrahydropyranyl ether is reacted with crotyl bromide in the manner described in Example 1(b) to give 4-crotyl-benzyl alcohol containing 15% (1-methallyl)-benzyl alcohol, B.P. 113–20°/2.5 mm., $n_D^{20}$ 1.5373.

(b) 4-crotyl-benzyl alcohol is reacted with (±)-cis-transchrysanthemoyl chloride as described in Example 1 (c) to give 4-crotyl-benzyl (±)-cis-trans-chrysanthemate, B.P. 158–64°/6×10$^{-3}$ mm., $n_D^{20}$ 1.5180.

EXAMPLE 8

*4-propenyl-benzyl (±)-cis-trans-chrysanthemate*

(a) Propionaldehyde (58 g.) in 200 mls. ether is added over an hour to 4-bromo-phenyl magnesium bromide, from 237 g. p-dibromo benzene and 27 g. magnesium, in ether. The complex is decomposed with 10% sulphuric acid after 30 minutes stirring and the ether layer separated, washed and dried and evaporated to give 110 g. of the crude carbinol, B.P. 80–120°/1 mm. The crude distillate is heated with 50 g. freshly fused potassium hydrogen sulphate at 160° for four hours and then distilled to give 82 g. 4-bromo-propenyl benzene, B.P. 106–15°/ 12 mm.

A mixture of 59.1 g. 4-bromo-propenyl benzene and 56.4 g. ethylene dibromide in 300 ml. ether are added with stirring to 15 g. magnesium over one hour. Gaseous formaldehyde from 30 g. paraformaldehyde is passed in and the complex decomposed with 10% sulphuric acid. The ether layer is separated, washed, dried and evaporated and the residue refluxed with 0.6 g. p-toluene sulphonic acid in 200 ml. 50% aqueous ethanol for one hour. After cooling excess sodium carbonate is added, the solution filtered and evaporated and the residue taken into ether. The ether layer is finally washed and distilled to give 4-propenylbenzyl alcohol, B.P. 111–15°/0.2 mm., M.P. 35–42°.

(b) 4-propenyl-benzyl alcohol is reacted with (±)-cis-trans-chrysanthemoyl chloride in the manner described in Example 1(c) to give 4-propenyl-benzyl (±)-cis-trans-chrysanthemate, B.P. 150–4°/10$^{-2}$ mm., $n_D^{20}$ 1.5374.

EXAMPLE 9

*4-(2'-methallyl)benzyl (±)-cis-trans-chrysanthemate*

4-bromobenzyl alcohol tetrahydropyranyl ether is reacted with 2-methallyl bromide in the manner described in Example 1(b) to give 4-(2'-methallyl)benzyl alcohol, B.P. 105–11°/2 mm., M.P. 31°, $n_D^{20}$ 1.5340.

(b) 4-(2'-methallyl)benzyl alcohol is reacted with (±)-cis-trans-chrysanthemoyl chloride in the manner described in Example 1(c) to give 4-(2'methallyl)benzyl (±) - cis - trans-chrysanthemate, B.P. 140–48°/0.9×10$^{-2}$ mm., $n_D^{20}$ 1.5170.

EXAMPLE 10

*4-allyl-2-methyl benzyl (±)-cis-trans-chrysanthemate*

(a) 4-bromo-2-methyl-benzyl alcohol is prepared by oxidising 4-bromo-o-xylene with nitric acid and reducing the resulting 4-bromo-o-toluic acid with lithium aluminium hydride. The 4-bromo-2-methyl-benzyl alcohol is then converted to the tetrahydropyranyl ether, reacted with allyl bromide and the protecting ether group removed in the manner described in Example 1(b) to give 4-allyl-2-methyl-benzyl alcohol, B.P. 109–19°/2 mm., $n_D^{20}$ 1.5403.

(b) 4-allyl-2-methyl benzyl alcohol is reacted with (±)-cis-trans-chrysanthemoyl chloride in the manner described in Example 1(b) to give 4-allyl-2-methyl benzyl (±)-cis-trans-chrysanthemate, B.P. 138–40°/0.8×10$^{-2}$ mm., $n_D^{20}$ 1.5221.

EXAMPLE 11

*4-allyl-2,5-dimethyl-benzyl (±)-cis-trans-chrysanthemate*

(a) Allyl bromide (36.3 g.) is added to a Grignard reagent prepared from 66 g. 2,5-dibromo-p-xylene and 6.6 g. magnesium in ether. The mixture is stirred and refluxed for 2 hours, allowed to stand over-night and the complex decomposed with ice to give 42.6 g. 4-allyl-2,5-dimethyl-bromo benzene, B.P. 86–91°/1 mm., $n_D^{20}$ 1.5588.

A Grignard reagent prepared from 2.4 g. of magnesium and 20 g. 4-allyl-2,5-dimethyl-bromo benzene in 400 ml. tetrahydrofuran is treated with excess gaseous formaldehyde. After decomposition and processing the product is distilled with steam from 10% aqueous sulphuric acid, to decompose the formal, and the steam distillate is saturated with sodium chloride and extracted with ether. The ether solution is washed, dried and distilled to give 2.34 g. 4-allyl-2,5-dimethyl benzyl alcohol, B.P. 97–107°/3.1×10$^{-2}$ mm., $n_D^{20}$ 1.5396.

(b) 4-allyl-2,5-dimethyl benzyl alcohol is reacted with (±)-cis-trans-chrysanthemoyl chloride in the manner described in Example 1(c) to give 4-allyl-2,5-dimethyl-benzyl (±)-cis-trans-chrysanthemate, B.P. 134–6°/10$^{-2}$ mm., $n_D^{20}$ 1.5232.

EXAMPLE 12

*4-allyl-tetramethyl-benzyl (±)-cis-trans-chrysanthemate*

(a) Dibromodurene M.P. 211° is prepared by bromination of durene, the dibromide is reacted with magnesium in tetrahydrofuran and then with allyl bromide to give, after purification, 4-allyl-tetramethylbromobenzene, $n_D^{20}$ 1.5771 B.P. ca. 100°/0.03 mm. When reacted with magnesium in tetrahydrofuran and then with formaldehyde, 4-allyltetramethyl benzyl alcohol M.P. 109°, is obtained after decomposition of the complex and purification.

(b) 4-allyl-tetramethyl benzyl alcohol is reacted with (±)-cis-trans-chrysanthemoyl chloride in the manner described in Example 1(c) to give 4-allyl-tetramethyl benzyl (±)-cis-trans-chrysanthemate, B.P. 140–50°/0.1 mm., M.P. 53–7°.

EXAMPLE 13

*2,4,6-trimethyl benzyl (±)-cis-trans-chrysanthemate*

(±)-cis-trans-chrysanthemic acid is neutralised to phenolphthalein in ethanol with sodium or potassium hydroxide and treated with a slight excess of silver nitrate in water. The silver salt of (±)-cis-trans chrysanthemic acid precipitates and is collected and dried. The silver salt (1.2 mols.) is added to a carbon tetrachloride solution of 1 mol. of 2,4,6-trimethyl benzyl chloride, prepared by chloromethylation of mesitylene, the mixture allowed to stand overnight and then warmed on a steam bath for 60 minutes.

The solution is then cooled, filtered using a filter aid and distilled to give 2,4,6-trimethyl benzyl (±)-cis-trans-chrysanthemate, B.P. 151–64°/0.2 mm., $n_D^{20}$ 1.5200, M.P. 51° after recrystallization from hexane.

2,4,6-trimethyl benzyl chloride may also be reacted with the silver salt of (±)-3-phenyl-2,2-dimethyl-cyclopropane carboxylic acid, prepared from the acid in the manner described above, to give 2,4,6-trimethyl-benzyl (±)-3-phenyl-2,2-dimethylcyclopropane carboxylate, B.P. 153–60°/3×10$^{-3}$ mm., $n_D^{20}$ 1.5498.

EXAMPLE 14

*Pentamethyl benzyl (±)-cis-trans-chrysanthemate*

Pentamethyl benzyl chloride, prepared by dichloromethylating mesitylene, reducing the product with zinc dust in sodium hydroxide and chloromethylating the resulting pentamethyl benzene or by monochlorination of hexamethyl benzene with sulphuryl chloride, is reacted with the silver salt of (±)-cis-trans chrysanthemic acid in the manner described in Example 13 to give pentamethyl benzyl (±)-cis-trans chrysanthemate, B.P. 186–93°/0.4 mm., M.P. 65–71°.

EXAMPLE 15

*4-allyl-2,6-dimethylbenzyl (±)-cis-trans-chrysanthemate*

(a) *4-allyl-2,6-xylidine.*—2,6-xylidine (1440 g.) and allyl chloride (459 g.) are heated at 100° for 8 hours, then allowed to cool, diluted with xylene (4.5 l.), and shaken first with 20% sodium hydroxide solution (1.5 l.) and then with 2×500 ml. of saturated sodium chloride solution. The organic layer, essentially a solution of N-allyl 2,6-xylidine, is dried by azeotropic distillation, then heated with anhydrous zinc chloride powder (1700 g.) to reflux temperature for 2 hours with efficient stirring, even when the reaction mixture has become semi-solid. The mixture is decomposed by stirring with a solution of sodium hydroxide (900 g.) in water 3 l.). The resulting organic layer, together with an ether extract (1 l.) of the aqueous layer, is washed with saturated sodium chloride, dried over sodium sulphate, and fractionally distilled to give recyclable 2,6-xylidine (706 g.) B.P. 52–55° at 0.3 mm. and 4-allyl 2,6-xylidine (728 g.) B.P. 80–85° at 0.3 mm. $n_D^{20}$ 1.5534. The yield is 73% based on unrecovered 2,6-xylidine.

(b) *4-allyl-2,6-dimethylbromobenzene.*—Cuprous bromide (1900 g.) is prepared by treating a stirred mixture of copper sulphate (3.6 kg.) and sodium bromide (2.1 kg.) in water (12 l.) with sodium sulphite (3 kg.). After cooling, the product is separated by filtration, washed thoroughly with water and dried.

4-allyl-2,6-xylidine (960 g.) in water (1.5 l.) and hydrobromic acid (48%, 1.8 l.) is treated with stirring below 0° with sodium nitrite (420 g.) in water (750 ml.). After 15 minutes the solution is added to cuprous bromide (1730 g.) in hydrobromic acid (48%, 2160 ml.) and benzene (3000 ml.) at room temperature; the mixture is stirred at 20° for 30 minutes then gradually heated to 50° and maintained at this temperature for 30 minutes.

The separated organic layer is then distilled with steam until approximately 30 l. of distillate is collected. The organic layer in the distillate is collected with more benzene (3 l.) and the organic phases are combined and evaporated at reduced pressure. The residue is stirred with Claisen's alkali (made by dissolving potassium hydroxide (1575 g.) in water 1125 ml.) and diluting to 4.5 l. with methanol) at 50° for 30 minutes and the bromo compound isolated by extraction with benzene (2 portions of 3 l. each). The benzene solution is washed with saturated sodium chloride (2 portions of 1.5 litres), dried (Na$_2$SO$_4$) and evaporated at reduced pressure. Distillation of the residue up a column gives 4-allyl-2,6-dimethylbromobenzene, B.P. 135°/10 mm., $n_D^{20}$ 1.5533. Yield, 675 g., 50%.

(c) *4-allyl-2,6-dimethylbenzyl alcohol.*—Formaldehyde (generated by heating 60 g. of paraformaldehyde) is passed into a Grignard reagent prepared from 4-allyl-2,6-dimethylbromobenzene (169 g.) and magnesium (20 g.) in tetrahydrofuran (700 ml.), until reaction is complete (detected by the cessation of heat generation). After setting aside at room temperature for 1 hour, saturated ammonium chloride solution (300 ml.) is added and the aqueous layer separated. The solid inorganic phase is washed with ether, the combined organic layers evaporated and the residue refluxed with 50% aqueous ethanol (1000 ml.) containing toluene-p-sulphonic acid (3 g.) for 1 hour. The ethanol is evaporated in the presence of sodium carbonate and the residue is taken up in ether and washed with saturated sodium hydroxide (500 ml. of 10%) and saturated sodium chloride (2×500 ml.). After drying (Na$_2$SO$_4$) and evaporation, there is isolated by distillation at 3×10$^{-2}$ mm., 62 g. (47%) of 4-allyl-2,6-dimethylbenzyl alcohol, B.P. 85–92°, $n_D^{20}$ 1.5396, M.P. 49°.

(d) *4 - allyl - 2,6-dimethylbenzyl (±)-cis-trans-chrysanthemate.*—(±) - Cis-trans-chrysanthemoyl chloride in benzene (100 ml.) is added dropwise to a stirred solution of 4-allyl-2,6-dimethylbenzyl alcohol (27 g.) in ether at −20°. After setting aside overnight, the mixture is poured onto ice and diluted with ether. The mixed solvents are washed with dilute sulphuric acid, with saturated potassium hydrogen carbonate and dried (Na$_2$SO$_4$). Evaporation of the solvents and distillation of the residue gives the required ester (41 g., 84%) B.P. 141–144°/3×10$^{-3}$ mm., $n_D^{20}$ 1.5224.

EXAMPLE 16

*4-allyl-2,6-dimethyl benzyl (+)-trans chrysanthemate*

4-allyl-2,6-dimethyl benzyl alcohol is reacted as described in Example 15, with (+)-trans chrysanthemoyl chloride, B.P. 106–107.5°/12 mm., prepared by treating the acid with thionyl chloride at below room temperature to give 4-allyl-2,6-dimethyl benzyl (+)-trans chrysanthemate, B.P. 137–142°/10$^{-2}$ mm., $n_D^{20}$ 1.5200.

EXAMPLE 17

*4-(2'-methallyl)-2,6-dimethyl benzyl (±)-cis-trans chrysanthemate*

4-(2' - methallyl) - 2,6 - dimethyl benzyl alcohol, B.P. 103–108°/0.05 mm., $n_D^{20}$ 1.5412 is prepared by reacting 4-bromo-2,6-dimethyl benzyl alcohol with dihydropyran, converting the resulting 4-bromo-2,6-dimethyl benzyl alcohol tetrahydropyranyl ether to the Grignard reagent and reacting this organo-magnesium compound with 2'-methallyl bromide. The protecting ether group is finally removed by refluxing the ether with a little p-toluene sulphonic acid in 50% aqueous ethanol. The 4-bromo-2,6-dimethyl benzyl alcohol may be obtained by bromination of 2,6-xylidine in acetic acid, conversion of the amino group to a nitrile group via the diazonium compound and hydrolysis of the nitrile group followed by esterification and hydride reduction to give the desired benzyl alcohol. The alcohol is then esterified with (±)-cis-trans chrysanthemoyl chloride as described in Example 15 to give 4-(2'-methallyl)-2,6-dimethyl benzyl (±)-cis-trans chrysanthemate, B.P. 150–151°/0.1 mm., $n_D^{20}$ 1.5220.

EXAMPLE 18

*Pentafluorobenzyl (±)-cis-trans chrysanthemate*

Pentafluorobenzyl alcohol, prepared by esterifying pentafluorobenzoic acid and reducing the ester group with lithium aluminium hydride, is esterified with (±)-cis-trans-chrysanthemoyl chloride as described in Example 1(c) to give pentafluorobenzyl (±)-cis-trans chrysanthemate, B.P. 111°/4×10$^{-2}$ mm., $n_D^{20}$ 1.4818.

EXAMPLE 19

*4-allyl 2,6-dimethyl-benzyl (±)-cis-trans-chrysanthemate*

A mixture of 2,6-dimethyl-4-allyl benzyl bromide (4.8 g., 0.02 mol.) prepared as described in Example 15, triethylamine (2.0 g., 0.02 mol.) and (±)-cis-trans-chrysanthemic acid (3.4 g., 0.02 mol.) is heated at 100° for 5 hours, then cooled and shaken with ether (100 ml.) and 10% sulphuric acid (100 ml.). The ether layer is washed with 10% sodium hydroxide (100 ml.), saturated sodium chloride (2×50 ml.), then dried over sodium sulphate, and distilled to give 4.9 g. (75% of theory) 2,6-dimethyl-4-allylbenzyl (±)-cis-trans-chrysanthemate, $n_D^{20}$ 1.5263, $b_{0.02}$ 136–140°.

EXAMPLE 20

*4-trans-sorbyl-benzyl (±)-cis-trans-chrysanthemate*

4-bromobenzyl alcohol tetrahydropyranyl ether is reacted with sorbyl chloride in the manner described in Example 1(b) to give a mixture of 4-sorbyl-benzyl alcohols from which the crystalline 4-trans-sorbyl-benzyl alcohol, M.P. 57°, was recovered by recrystallisation from hexane. This alcohol was then esterified with (±)-cis-trans-chrysanthemoyl chloride as described in Example 1(c) to give 4-trans-sorbyl-benzyl (±)-cis-trans-chrysanthemate, B.P. 157–620°/10$^{-2}$ mm., $n_D^{20}$ 1.5340.

EXAMPLE 21

A space spray containing 4-allylbenzyl (±)-cis-trans-chrysanthemate suitable for combating houseflies or mosquitoes may be generated from the following formulation:

| | Percent |
|---|---|
| Active component | 0.2 |
| Odourless petroleum distillate (B.P. 200–265°) | 99.8 |

EXAMPLE 22

4 - allyl-2,6-dimethyl - benzyl (±)-cis-trans-chrysanthemate is formulated as an aerosol according to the following composition:

| | Percent |
|---|---|
| Active component | 0.8 |
| Perfume | 0.2 |
| Odorless petroleum distillate (B.P. 200–265°) | 19.0 |
| Propellant | 80.0 |

A suitable propellant for this aerosol is a mixture of equal quantities of trichloromonofluoromethane and dichlorodifluoromethane.

EXAMPLE 23

A spray or fog suitable for the control of crawling insects such as moth larvae, weevils, beetles, cockroaches etc. in warehouses for example may be generated from the following formulation:

| | Percent by wt. |
|---|---|
| 4-allyl-2,6-dimethyl-benzyl (±)-cis-trans-chrysanthemate | 1 |
| Highly refined heavy oil | 99 |

A suitable heavy oil for this formulation is one having a distillation range of about 320–360° and an unsulphonatable residue of above 98%.

EXAMPLE 24

A water miscible concentrate is formulated as follows:

| | Percent by wt. |
|---|---|
| 4-allyl-2,6-dimethyl-benzyl (±)-cis-trans-chrysanthemate | 6 |
| Xylene | 69 |
| Non-ionic emulsifier e.g. "Ethylan B.P.C." | 25 |

This concentrate may then be diluted at the rate of 30 ccs. to 4½ litres of water prior to use.

Any of the other pyrethroids of the general Formula I mentioned above may be similarly formulated into compositions of the type described in Examples 21–24.

The insecticidal spectrum of various compounds of the invention has been investigated by topical application of the active compound in acetone to adult houseflies (*Musca domestica*) and adult mustard beetles (*Phaedon cochle-*

*ariae*). Comparative toxicities are shown in the following table in which the figures in the tables are relative to (±) allethronyl (±)-cis-trans-chrysanthemate (allethrin) which is given a potency figure of 100.

| Active Compound | Housefly test *Musca domestica* L. | Mustard bettle test *Phaedon cochleariae* Fab. |
|---|---|---|
| Pyrethrins (as 25% extract) | 100 | 400 |
| (±) allethronyl (±)-cis-trans chrysanthemate (allethrin) | 100 | 100 |
| 4-allyl-benzyl (+)-trans-chrysanthemate | 500 | 22 |
| 4-allyl-benzyl (±)-cis-trans-chrysanthemate | 250 | 17 |
| 4-(2'methallyl)benzyl (±)-cis-trans-chrysanthemate | 100 | 80 |
| 4-allyl-2-methyl-benzyl (±)-cis-trans-chrysanthemate | 200 | 70 |
| 4-vinyl (±)-cis-trans-chrysanthemate | 30 | 1 |
| 4-crotyl (±)-cis-trans-chrysanthemate | 70 | 20 |
| 2,4,6-trimethylbenzyl (±)-cis-trans-chrysanthemate | 60 | 100 |
| 2,4-dimethyl-benzyl (±)-cis-trans chrysanthemate | 30 | 50 |
| Pentamethylbenzyl (±)-cis-trans chrysanthemate | 20 | 140 |
| 4-allyl-2,6-dimethyl-benzyl (±)-cis-trans-chrysanthemate | 250 | 200 |
| 4-allyl-2,6-dimethyl-benzyl (+)-trans-chrysanthemate | 500 | 250 |
| 4-(2'-methallyl)-2,6-dimethyl-benzyl (±)-cis-trans-chrysanthemate | 60 | 80 |

I claim:
1. A compound of the formula

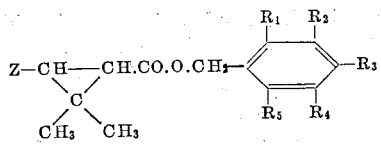

in which Z is isobutenyl or 2-carbomethoxy-prop-1-enyl, $R_3$ is halogen, lower alkenyl, lower alkadienyl or cyclopent-2-enyl, and $R_1$, $R_2$, $R_4$, and $R_5$, are each hydrogen or lower alkyl.

2. A compound according to claim 1 in which $R_3$ is allyl, methallyl, but-2-enyl, but-3-enyl, penta-2,4-dienyl, hexa-2,4-dienyl or cyclopent-2-enyl.

3. 4-allylbenzyl chrysanthemate.
4. 4-allyl-2,6-dimethylbenzyl chrysanthemate.
5. 4-(2'-methallyl)-2,6-dimethylbenzyl chrysanthemate.
6. 4-allyl-tetramethylbenzyl chrysanthemate.

References Cited

UNITED STATES PATENTS

| | | | |
|---|---|---|---|
| 2,806,883 | 9/1957 | Mikeska et al. | 260—618 |
| 2,857,309 | 10/1958 | Barthel | 260—468 |
| 3,069,399 | 12/1962 | Abramo et al. | 260—618 |

OTHER REFERENCES

Gersdorff, et al.: "J. Economic Entomology," vol. 52 (1959) pp. 521–524.

Richter: "Textbook of Org. Chem.," 3rd ed. (1952) pp. 194.

LORRAINE A. WEINBERGER, *Primary Examiner.*

RICHARD K. JACKSON, *Assistant Examiner.*